(12) United States Patent
Tasaka

(10) Patent No.: US 7,965,371 B2
(45) Date of Patent: Jun. 21, 2011

(54) METHOD AND APPARATUS FOR PRODUCING ELECTRO-OPTICAL DEVICE

(75) Inventor: Kazuo Tasaka, Eniwa (JP)

(73) Assignee: Seiko Epson Corporation, Tokyo (JP)

( * ) Notice: Subject to any disclaimer, the term of this patent is extended or adjusted under 35 U.S.C. 154(b) by 385 days.

(21) Appl. No.: 12/008,903

(22) Filed: Jan. 15, 2008

(65) Prior Publication Data

US 2008/0180628 A1 Jul. 31, 2008

(30) Foreign Application Priority Data

Jan. 30, 2007 (JP) ................................ 2007-018863

(51) Int. Cl.
*G02F 1/13* (2006.01)
(52) U.S. Cl. ........................................................ 349/187
(58) Field of Classification Search .................... 349/187
See application file for complete search history.

(56) References Cited

U.S. PATENT DOCUMENTS 5,492,582 A * 2/1996 Ide et al. ........................ 156/106
6,366,334 B1 * 4/2002 Inou et al. ..................... 349/187

FOREIGN PATENT DOCUMENTS

| JP | 11-179694 | 7/1999 |
| JP | 2000-321561 | 11/2000 |
| JP | 2002-107740 | 4/2002 |

* cited by examiner

*Primary Examiner* — David Nelms
*Assistant Examiner* — Phu Vu
(74) *Attorney, Agent, or Firm* — AdvantEdge Law Group, LLC

(57) ABSTRACT

A method of manufacturing an electro-optical device by cutting up a pair of mother substrates that are joined to each other by means of a sealant with an electro-optical material being sandwiched therebetween into a plurality of panel formation regions. The method includes: forming a groove along each of at least two pre-work cut lines in either one of the pair of mother substrates; blowing air on one edge face of a region between the grooves formed in the one of the pair of mother substrates; and removing the region between the grooves formed in the one of the pair of mother substrates by vacuuming the region. Herein, the vacuuming is applied to the other edge face of the region.

5 Claims, 9 Drawing Sheets

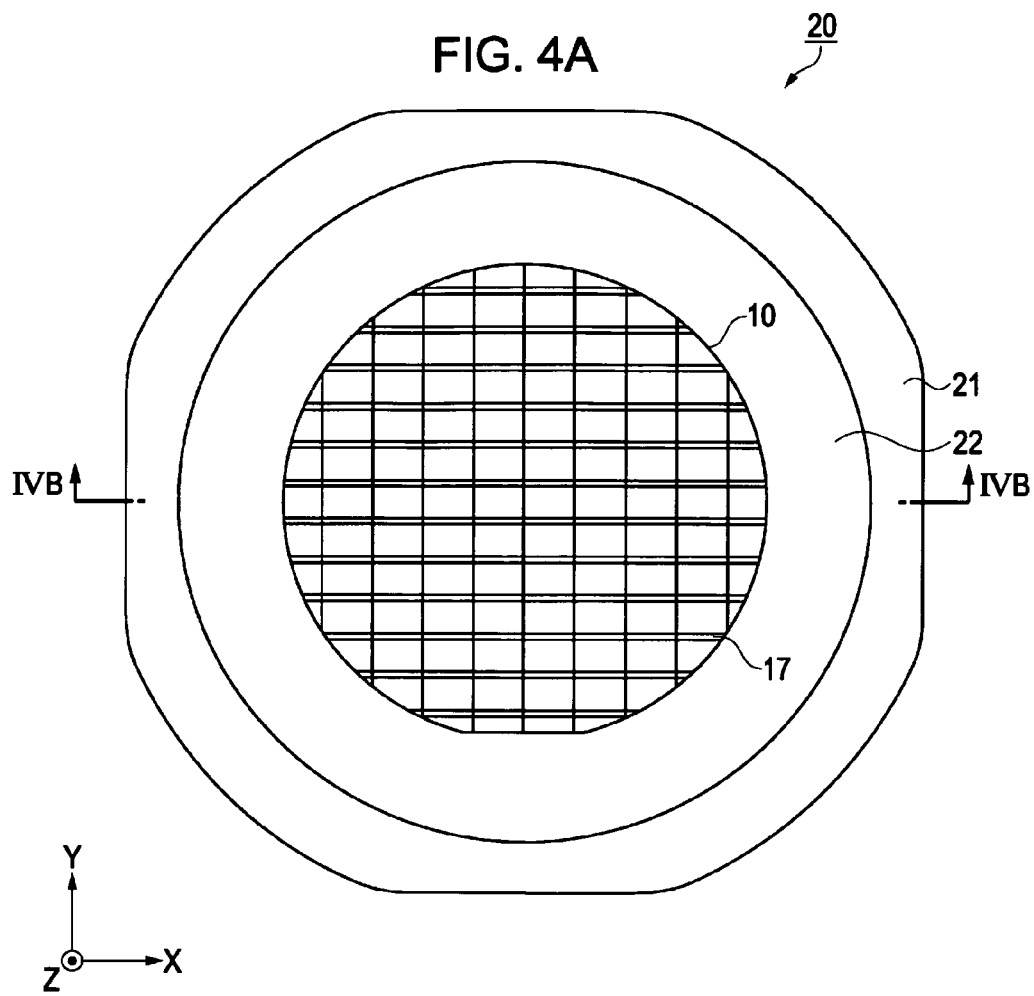
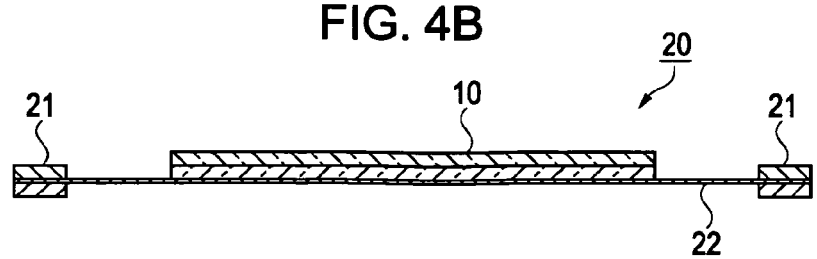

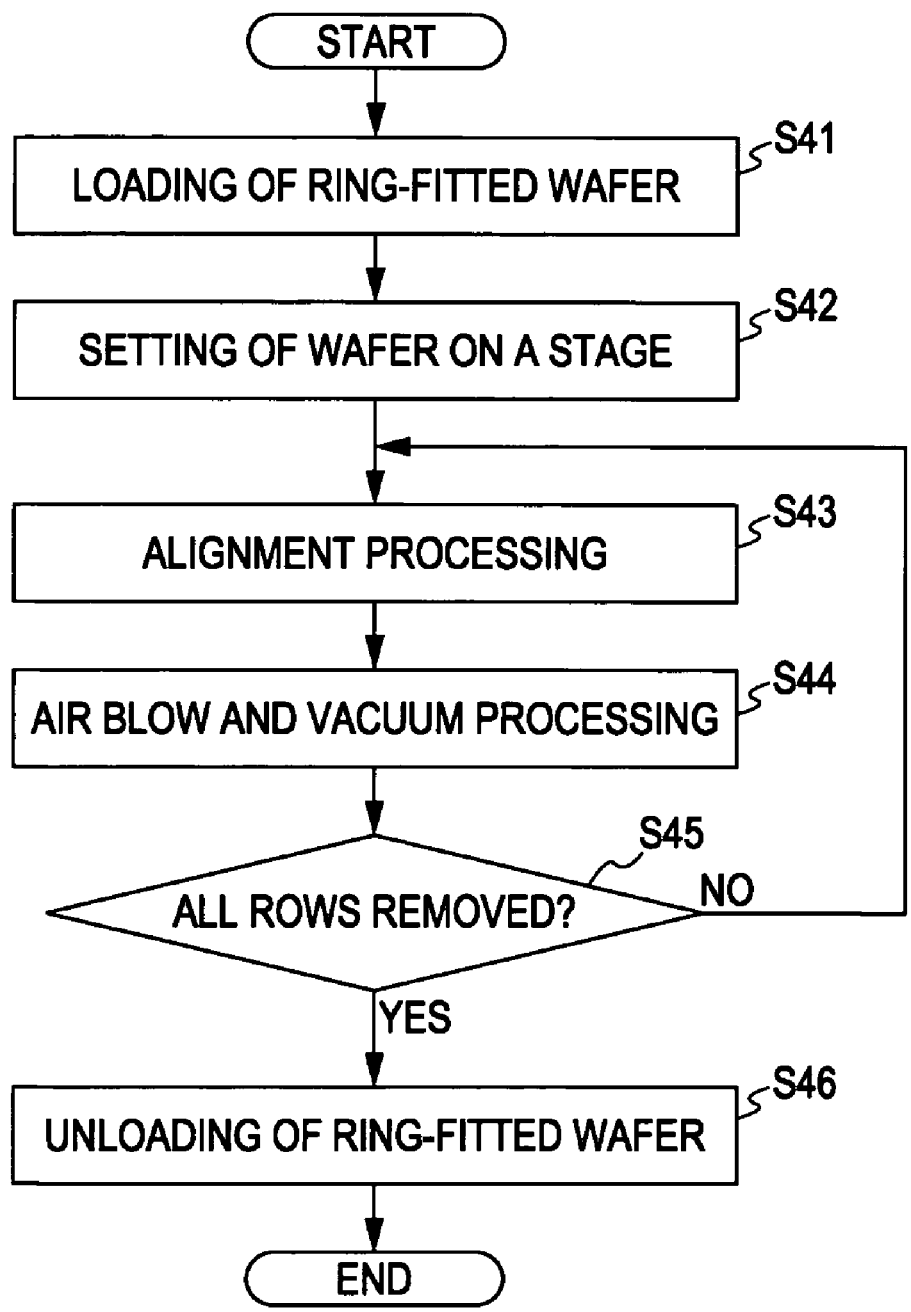

METHOD AND APPARATUS FOR PRODUCING ELECTRO-OPTICAL DEVICE

BACKGROUND

1. Technical Field

The present invention relates to a method for producing an electro-optical device. In addition, the invention further relates to an apparatus for producing an electro-optical device.

2. Related Art

As described in JP-A-2002-107740, a one drop fill (ODF) method is known in the technical field pertaining to the invention as a process for manufacturing a liquid crystal display, which is an example of a variety of electro-optical devices. In the ODF method, a liquid crystal material is dropped on an element substrate (or, more exactly, an uncut substrate). After dropping of the liquid crystal material thereon, the element substrate and a counter substrate are adhered to each other via a sealant that is provided in the form of a frame. In this way, liquid crystal is sealed inside a space demarcated by the element substrate, the counter substrate, and the frame-pattern sealant. Typically, in the ODF process, the element substrate and the counter substrate are joined to each other before cutting thereof. That is, at this manufacturing stage, each of the element substrate and the counter substrate that has various kinds of constituent elements, layers, and the like formed thereon has not yet cut up into individual displays. Therefore, after the adhesion process, it is necessary to remove a regional part of the counter substrate that covers a terminal region of the element substrate so that the terminal region of the element substrate is exposed. In order to remove the regional part of the counter substrate for the purpose described above, the counter substrate is subjected to scribe-and-break processing. Then, after separation of the removal target region from the remaining region of the counter substrate as a result of the scribe-and-break processing, the target region, that is, a portion of the counter substrate that covers the terminal region of the element substrate, is removed manually in the typical method of the related art.

Disadvantageously, however, such a manual removal method has a risk of damaging the terminal region of the element substrate because, at the time of manual removal of the target region, the target region might, for example, scratch the terminal region of the element substrate due to an ultra-short distance between the element substrate and the counter substrate, which is a few micrometers or so.

SUMMARY

An advantage of one aspect of the invention is to provide a method for removing a part of a counter substrate without substantially damaging the terminals of an element substrate.

In order to address the above-identified problem without any limitation thereto, the invention provides, as a first aspect thereof, a method for producing an electro-optical device that is manufactured by cutting up a pair of mother substrates that are joined to each other by means of a sealant with an electro-optical material being sandwiched therebetween into a plurality of panel formation regions, the method including: forming a groove along each of at least two pre-work cut lines in either one of the pair of mother substrates; blowing air on one edge face of a region between the grooves formed in one of the pair of mother substrates; and removing region between the grooves formed in one of the pair of mother substrates by vacuuming region, the vacuuming being applied to the other edge face of region.

With the method for producing an electro-optical device according to the first aspect of the invention described above, it is possible to apply air pressure onto a region of either one of a pair of mother substrates, which is a target region to be removed, by blowing air onto an end face of removal target region. By this means, it is possible to cause region to come off from the remaining portion of one of the pair of mother substrates at the positions at which grooves are formed. By vacuuming region that has come off therefrom, it is possible to remove region from one of the pair of mother substrates. When region comes off from one of the pair of mother substrates, region is vacuumed toward a direction opposite the other of the pair of mother substrates. For this reason, it is unlikely that region gets drifted toward the other of the pair of mother substrates, which means that region is substantially free from a risk of contact with other of the pair of mother substrates. Therefore, with the method for producing an electro-optical device according to the first aspect of the invention described above, it is possible to remove region from one of the pair of mother substrates without substantially damaging either constituent elements formed on other of the pair of mother substrates or other of the pair of mother substrates itself. It should be noted that the blowing of air might be performed concurrently with the removing of region by vacuuming thereof. If so configured, it is possible not only to remove region in an efficient manner but also to significantly reduce the adverse possibility of any contact between region that has come off therefrom and other of the pair of mother substrates because a force that urges (i.e., moves) region away from other of the pair of mother substrates is constantly applied to (i.e., exerted on) region.

In the method for producing an electro-optical device according to the first aspect of the invention described above, it is preferable that each of the grooves should be formed by dicing as an incision that has a depth smaller than the thickness of one of the pair of mother substrates. Since each of the incisions has a depth smaller than the thickness of one of the pair of mother substrates, in the process of forming the grooves, it is possible to avoid either a dicing blade or any broken fragment piece or particle of one of the pair of mother substrates from damaging either the constituent elements formed on other of the pair of mother substrates (or other of the pair of mother substrates itself).

In the preferred method for producing an electro-optical device according to the first aspect of the invention described above, it is preferable that, prior to the formation of each of the grooves, one of the pair of mother substrates should have been subjected to a scribe-and-break processing along one of at least two pre-work cut lines. With such a configuration, it is possible to weaken the mechanical strength of a joint portion between one of the pair of mother substrates and region to be removed, that is, the target removal region. Therefore, in the air blowing process, it is possible to easily remove region from the remaining portion of one of the pair of mother substrates.

In the preferred method for producing an electro-optical device according to the first aspect of the invention described above, it is preferable that air should be blown to an end face that has been subjected to the scribe-and-break processing. With such a configuration, since the air-blown side of the removal target region has already been disconnected from one of the pair of mother substrates in the preceding scribe-and-break processing, it is possible to cause region to come off from one of the pair of mother substrates by means of a pressure applied thereto by the air in an easy manner.

In the method for producing an electro-optical device according to the first aspect of the invention described above, it is preferable that the electro-optical device should have, as a pair of substrates, an element substrate that has a pixel electrode and a circuit element which is electrically connected to the pixel electrode, and a counter substrate that has a counter electrode provided opposite the pixel electrode; one of the pair of mother substrates should have a plurality of the counter substrates; and the other of the pair of mother substrates should have a plurality of the element substrates.

In order to address the above-identified problem without any limitation thereto, the invention provides, as a second aspect thereof, an apparatus for producing an electro-optical device, the apparatus being configured to remove a region between two grooves formed in either one of a pair of mother substrates that are joined to each other by means of a sealant with an electro-optical material being sandwiched therebetween, the apparatus including: a stage that supports the other of the pair of mother substrates; a blowing nozzle that blows air on one edge face of region between the grooves formed in one of the pair of mother substrates; and a vacuum nozzle that removes region between the grooves formed in one of the pair of mother substrates by vacuuming region, the vacuuming being applied to the other edge face of region.

With the configuration of the apparatus for producing an electro-optical device according to the second aspect of the invention described above, it is possible to apply air pressure onto a region of either one of a pair of mother substrates, which is a target region to be removed, by blowing air from a blowing nozzle onto an end face of removal target region. By this means, it is possible to cause region to come off from the remaining portion of one of the pair of mother substrates at the positions at which grooves are formed. While an air pressure is being applied to region, a suction force is applied thereto by a vacuum nozzle. By this means, it is possible to remove region from one of the pair of mother substrates. When region comes off from one of the pair of mother substrates, region is vacuumed toward a direction opposite the other of the pair of mother substrates. For this reason, it is unlikely that region gets drifted toward the other of the pair of mother substrates, which means that region is substantially free from a risk of contact with other of the pair of mother substrates. Therefore, with the configuration of the apparatus for producing an electro-optical device according to the second aspect of the invention described above, it is possible to remove region from one of the pair of mother substrates without substantially damaging either constituent elements formed on other of the pair of mother substrates or other of the pair of mother substrates itself.

BRIEF DESCRIPTION OF THE DRAWINGS

The invention will be described with reference to the accompanying drawings, wherein like numbers reference like elements.

FIG. 2A is a plan view that schematically illustrates an example of the configuration of a wafer, whereas

FIG. 3A is a plan view that schematically illustrates an example of the configuration of a liquid crystal panel, whereas

FIG. 4A is a plan view that schematically illustrates an example of the configuration of a ring-fitted wafer, whereas FIG. 4B is a sectional view taken along the line IVB-IVB of FIG. 4A.

FIG. 6 is a sub-flowchart that explains the detailed sub-processes contained in a small-piece removing process illustrated in FIG. 5.

DESCRIPTION OF EXEMPLARY EMBODIMENTS

With reference to accompanying drawings, exemplary embodiments of the invention are described below. It should be noted that, in the accompanying drawings that are mentioned below, the dimensions and/or scales of constituent elements are modified from those that will be adopted in an actual implementation of the invention for the purpose of making them easily recognizable in each illustration.

Apparatus for Producing Electro-Optical Device

Figure 1:
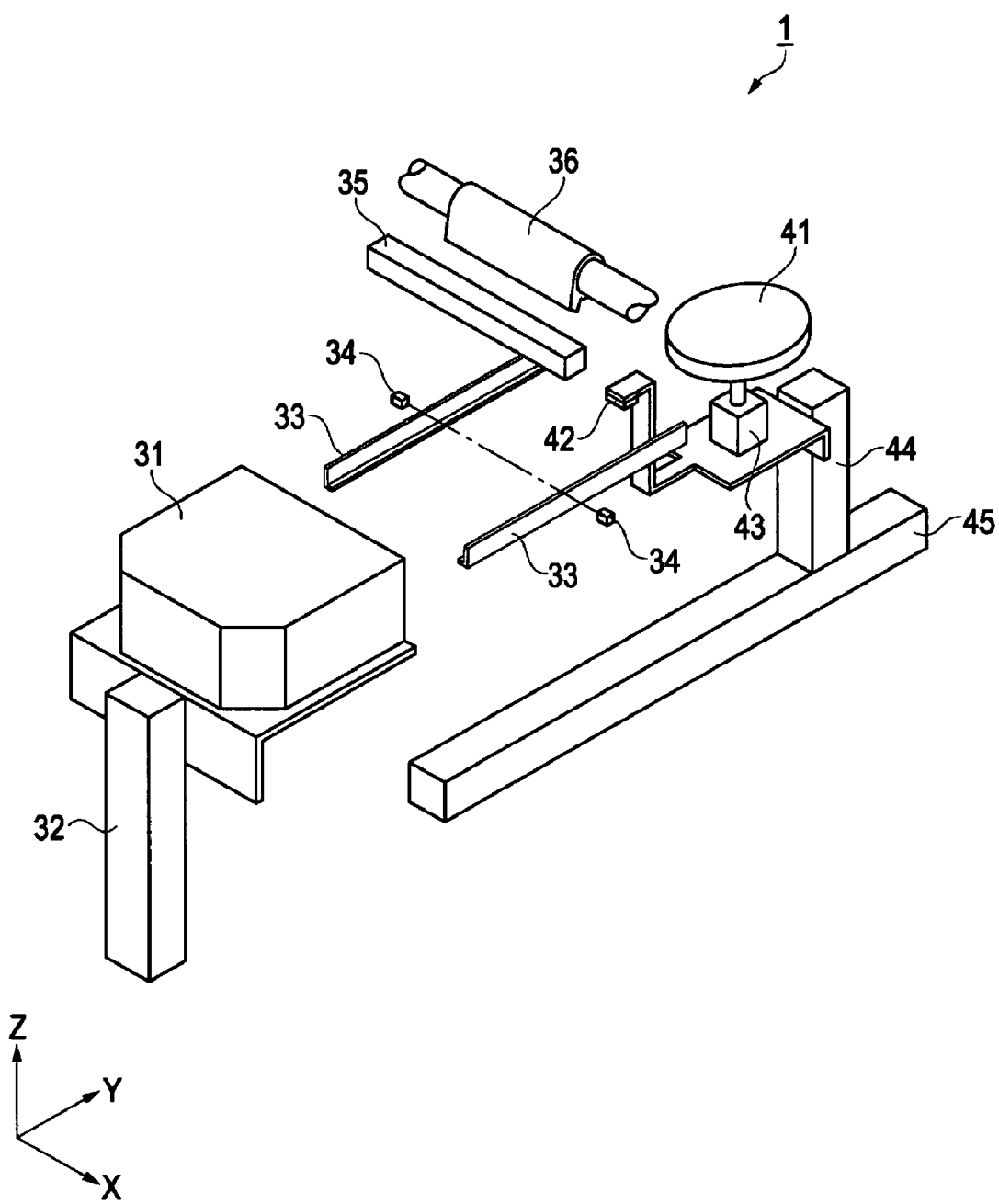
FIG. 1 is a perspective view that schematically illustrates an example of the configuration of a small-piece removing apparatus, which is an example of an apparatus for producing an electro-optical device according to an exemplary embodiment of the invention.

FIG. 1 is a perspective view that schematically illustrates an example of the configuration of an automatic small-piece removing apparatus 1, which is an example of an apparatus for producing an electro-optical device according to an exemplary embodiment of the invention. The small-piece removing apparatus 1 removes small pieces 17 out of a wafer 10, which is illustrated in FIGS. 2A and 2B.

Figure 2A:
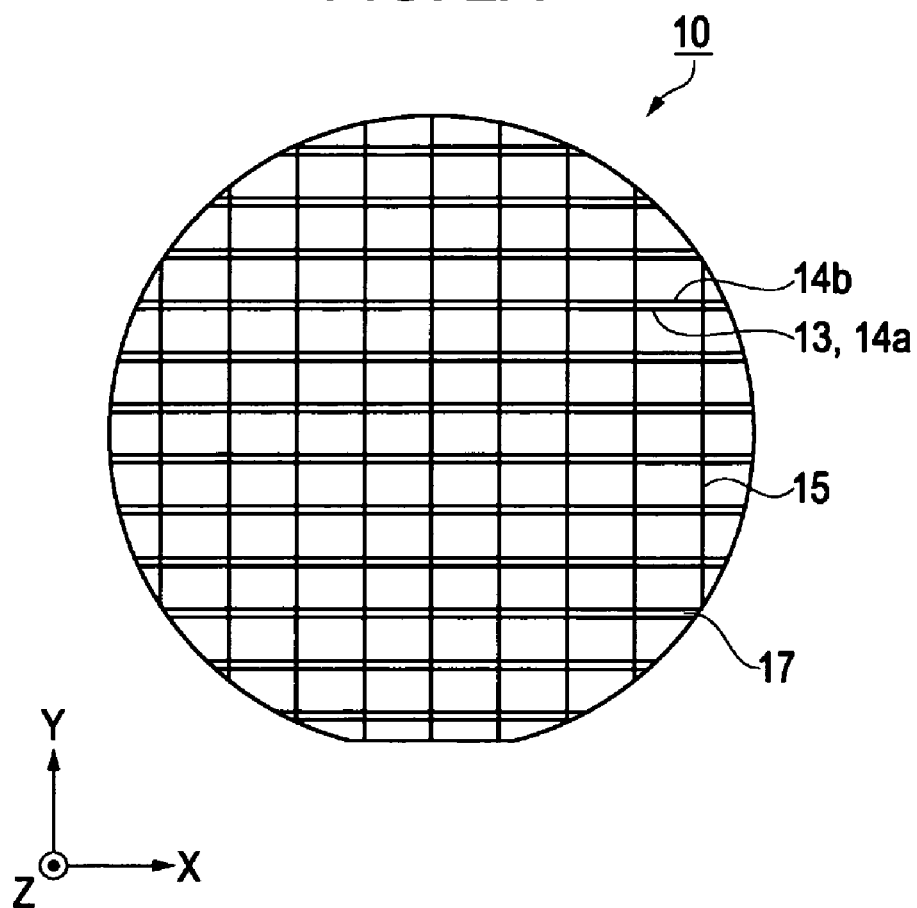
Figure 2B:
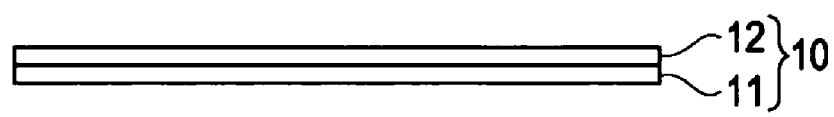
FIG. 2B is a side view thereof.

With reference to FIG. 2, an explanation is given below of the wafer 10, which is a composite or multi-tier substrate according to the present embodiment of the invention. FIG. 2A is a plan view that schematically illustrates an example of the configuration of the wafer 10, whereas FIG. 2B is a side view thereof. The wafer 10 is made up of a first mother substrate 11 and a second mother substrate 12, the latter of which is provided opposite to the former. These substrates are joined to each other. Each of the first mother substrate 11 and the second mother substrate 12 has a substantially disc-like shape, and has a base substrate substance made of quartz. The second mother substrate 12 corresponds to "(either) one of a pair of mother substrates" according to the invention. On the other hand, the first mother substrate 11 corresponds to "the other of the pair of the mother substrates" according to the invention.

The wafer 10 is an embodiment of a flow substrate used in the process of manufacturing a liquid crystal panel 50 (refer to FIGS. 3A and 3B), which is an example of an electro-optical device. A pair of the first mother substrate 11 and the second mother substrate 12 has a plurality of panel formation regions each of which has constituent elements that make up the liquid crystal panel 50. FIG. 2A illustrates a plurality of scribe lines 13 and 15 each as a solid line along which scribe-and-break processing is performed in the process of manufacturing the liquid crystal panel 50. In addition, FIG. 2A further illustrates a plurality of dicing lines 14a and 14b each as a solid line along which dicing processing is performed in the process of manufacturing the liquid crystal panel 50. After the removal of the small pieces 17 out of the second mother substrate 12 of the wafer 10, the wafer 10 is cut up into individual panel pieces along the scribe lines 13 and 15 that form a grid pattern. In this way, the liquid crystal panel 50 is manufactured. Herein, the small piece 17 corresponds to each region that lies between two dicing lines 14a and 14b that extend in parallel with each other. In this context, the term "between" refers to not a relatively wide region two edges of which are defined by the dicing lines 14a and 14b but a relatively narrow region two edges of which are defined by the dicing lines 14a and 14b. Each of the dicing lines 14a and 14b corresponds to a "pre-work cut line" according to the invention. The small piece 17 corresponds to a "region between (the) grooves" according to the invention.

Figure 3A:
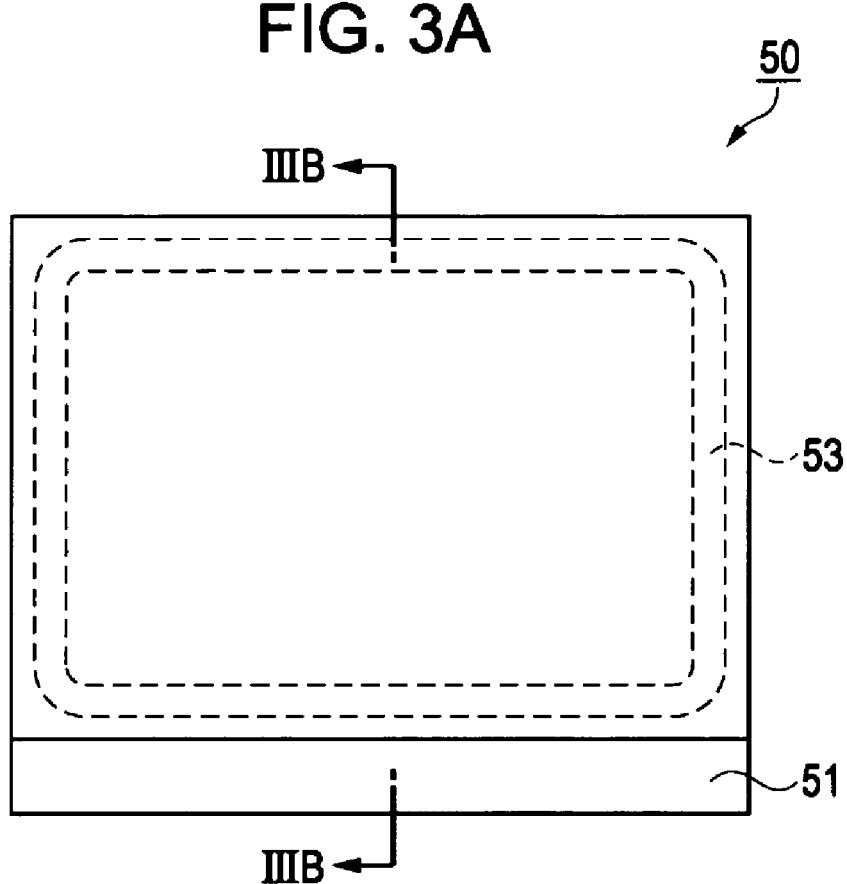
Figure 3B:
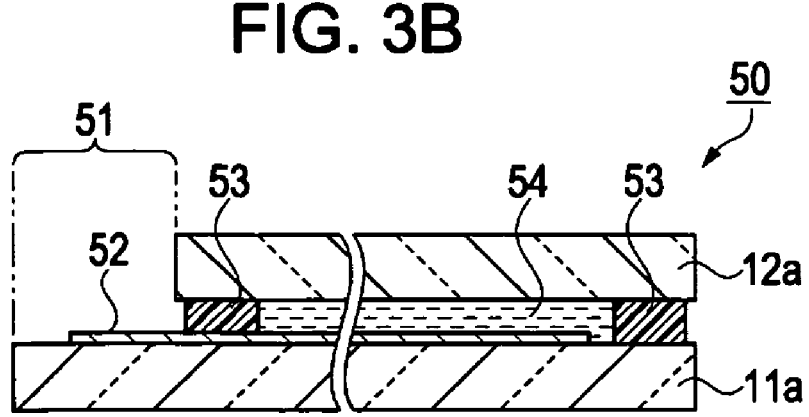
FIG. 3B is a sectional view taken along the line IIIB-IIIB of FIG. 3A.

FIG. 3A is a plan view that schematically illustrates an example of the configuration of the liquid crystal panel 50, which is an individual piece cut from the wafer 10. FIG. 3B is a sectional view taken along the line IIIB-IIIB of FIG. 3A. In the configuration of the liquid crystal panel 50, a rectangular element substrate 11a and a rectangular counter substrate 12a are adhered to each other via a sealant 53 that is provided in the form of a frame. The counter substrate 12a has a size smaller than that of the element substrate 11a. The element substrate 11a is obtained as an individual piece that is cut from the first mother substrate 11. On the other hand, the counter substrate 12a is obtained as an individual piece that is cut from the second mother substrate 12. Liquid crystal 54, which is an example of an electro-optical material, is sealed inside a space demarcated by the element substrate 11a, the counter substrate 12a, and the frame-pattern sealant 53. The thickness of the liquid crystal 54 is a few micrometers or so. In other words, the element substrate 11a and the counter substrate 12a are provided opposite to each other with a gap interval of a few micrometers or so therebetween. In accordance with the orientation state, that is, alignment state, of its liquid crystal molecules, the liquid crystal 54 is capable of changing the polarization of transmitted light. That is, the liquid crystal panel 50 is configured as an electro-optical device that performs image display by means of a polarization modulation function of the liquid crystal 54. As a non-limiting example of its application, the liquid crystal panel 50 may be used as a light valve of a projector, which is a non-limiting example of a variety of electronic apparatuses.

A plurality of pixel electrodes that applies a driving voltage to the liquid crystal 54, a plurality of circuit elements each of which is connected to the corresponding one of the pixel electrodes, and terminals 52 are formed on the liquid-crystal-side (54) surface of the element substrate 11a. The pixel electrodes and the circuit elements are not illustrated in the drawing. A counter electrode that is provided opposite to the pixel electrodes is formed on the liquid-crystal-side (54) surface of the counter substrate 12a. The counter electrode is not shown in the drawing. The terminals 52 that are formed on the element substrate 11a extend to a terminal region 51. The terminal region 51 is provided outside the frame-pattern sealant 53. It should be noted that the terminal region 51 is an open area over the element substrate 11a that is not covered by the counter substrate 12a, or in other words, an open area over the element substrate 11a where there is not any portion of the counter substrate 12a. In other words, the terminals 52 are exposed at the terminal region 51. An external circuit such as a flexible printed circuit (FPC) or the like that is electrically connected to a driver IC or the like is provided on the terminals 52. A regional part of the counter substrate 12a that lies at the terminal region 51 corresponds to the small piece 17 illustrated in FIG. 2. Or, in other words, a portion of the counter substrate 12a that has been removed and thus does not exist in the final liquid crystal panel 50 corresponds to the small piece 17 illustrated in FIG. 2.

When processed on the small-piece removing apparatus 1, the wafer 10 takes the form of a ring-fitted wafer 20 illustrated in FIGS. 4A and 4B. FIG. 4A is a plan view that schematically illustrates an example of the configuration of the ring-fitted wafer 20, whereas FIG. 4B is a sectional view taken along the line IVB-IVB of FIG. 4A. The ring-fitted wafer 20 is made up of a metal dicing ring frame 21, an elastic dicing tape 22, and the wafer 10. The elastic dicing tape 22 is stretched inside the dicing ring frame 21 with a tension. The wafer 10 is adhered to the surface of the elastic dicing tape 22.

Next, referring back to FIG. 1, the constituent components of the small-piece removing apparatus 1 are explained below. The small-piece removing apparatus 1 is provided with a wafer cassette 31, a cassette support pillar 32, a pair of guiding rails 33, a pair of infrared radiation sensors 34, a blowing nozzle 35, a vacuum nozzle 36, a stage 41, a chuck 42, a stage supporting unit 43, a stage support pillar 44, and a slider 45. Herein, the pair of infrared radiation sensors 34 might be referred to as a single infrared radiation sensor 34 having a pair of functional portions thereof, which will be described later.

The wafer cassette 31 is capable of storing a plurality of the ring-fitted wafers 20. The ring-fitted wafer 20 is drawn out of the wafer cassette 31 in the Y direction illustrated in the drawing. The cassette support pillar 32 that stands in the Z direction provides a mechanical support for the wafer cassette 31.

The pair of guiding rails 33 that extends in the Y direction is provided in front of the wafer cassette 31. The pair of guiding rails 33 provides a mechanical guidance for the ring-fitted wafer 20. The distance between these two guiding rails 33 that are parallel to each other is configured to be substantially equal to the diameter of the dicing ring frame 21. Since the pair of guiding rails 33 guides the dicing ring frame 21, it is possible to support the movement of the ring-fitted wafer 20 as a whole. The ring-fitted wafer 20 is guided on the guiding rails 33 in such an orientation that the coordinate axis of FIG. 1 and that of FIG. 4 match or overlap completely with each other. That is, the ring-fitted wafer 20 is supported on the guiding rails 33 in such an orientation that each row of the small pieces 17 that is aligned in the X direction illustrated in FIG. 4 is in parallel with the X axis of FIG. 1.

The pair of the infrared radiation sensors 34 is provided near the pair of the guiding rails 33. The pair of the infrared radiation sensors 34 (i.e., the single infrared radiation sensor 34) is made up of an infrared ray emission portion that irradiates an infrared ray in the X direction and an infrared ray reception portion that is capable of detecting the presence/absence of the infrared ray. Specifically, the infrared ray reception portion of the infrared radiation sensor 34 makes detection as to whether there is any light-shielding object between the infrared ray emission portion and the infrared ray reception portion thereof.

The slider 45 is provided in the negative Z direction when viewed from the guiding rails 33. Or, simply said, the slider 45 is provided below the guiding rails 33. The slider 45 extends along the Y direction. The stage support pillar 44, which stands in the Z direction, is mounted on the slider 45. The stage support pillar 44 can move on the slider 45 along the Y direction.

The stage supporting unit 43, the stage 41, and the chuck 42 are mounted to the stage support pillar 44. The stage supporting unit 43, the stage 41, and the chuck 42 are assembled in such a manner that the relative positions of these components are fixed with respect to each other. This assembly unit can move along the stage support pillar 44 in the Z direction as a whole though its relative positions are fixed with each other. In addition, since the stage support pillar 44 can move on the slider 45 along the Y direction as described above, this assembly unit can also move, together with the stage support pillar 44, on the slider 45 along the Y direction.

The chuck 42 can hold the dicing ring frame 21 of the ring-fitted wafer 20. In order to draw the ring-fitted wafer 20 out of the wafer cassette 31 and then carry it along the guiding rails 33, the stage support pillar 44 is moved along the slider 45 in the Y direction with the chuck 42 holding the dicing ring frame 21 of the ring-fitted wafer 20.

The stage 41 is a disc-shaped member that is attached to the stage supporting unit 43. The stage 41 is capable of holding the first mother substrate 11 of the wafer 10 by means of a suction force. The stage 41 is mounted to the stage supporting unit 43 in such a manner that it can rotate around the Z axis.

The blowing nozzle 35 and the vacuum nozzle 36 are provided in the positive Z direction when viewed from the guiding rails 33; that is, the blowing nozzle 35 and the vacuum nozzle 36 are provided above the guiding rails 33. The blowing nozzle 35 is capable of blowing compressed air on the wafer 10 that is set on the stage 41. The vacuum nozzle 36 is connected to a vacuum collection apparatus that is not illustrated in the drawing. With such a configuration, the vacuum nozzle 36 is capable of vacuuming up, in the positive Z direction, each of the small pieces 17 that have come off from the wafer 10. Each of the blowing nozzle 35 and the vacuum nozzle 36 is configured as a linear nozzle that extends in the X direction. Having such a configuration, the blowing nozzle 35 can blow compressed air on a plurality of the small pieces 17 of the wafer 10 illustrated in FIG. 2 that are aligned in a plurality of rows extending along the X direction not individually on a chip-by-chip basis but concurrently on a line-by-line basis. In like manner, the vacuum nozzle 36 can vacuum up each of the small pieces 17 that have come off from the wafer 10 not individually on a chip-by-chip basis but concurrently on a line-by-line basis.

Method for Producing Electro-Optical Device

Figure 5:
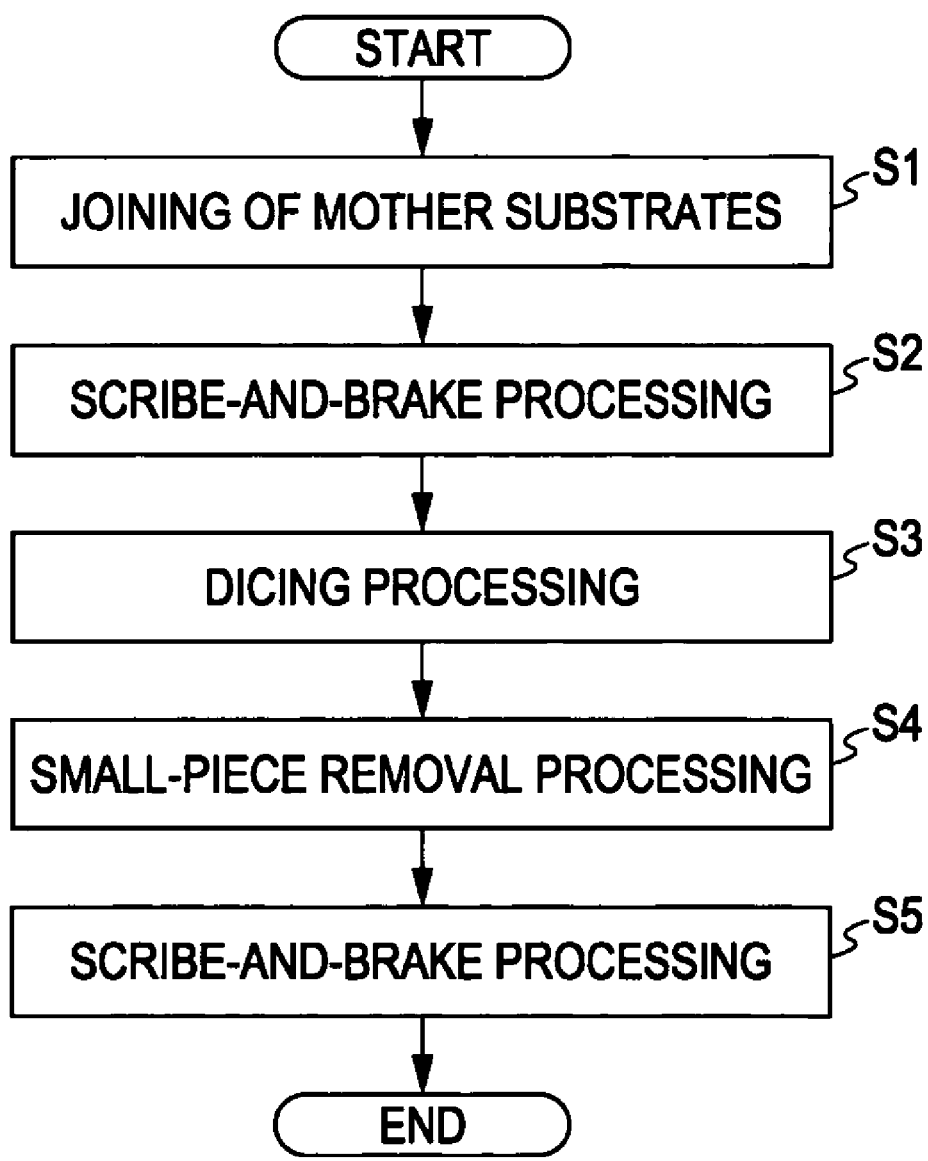
FIG. 5 is a flowchart that illustrates an example of a method for manufacturing a liquid crystal panel according to an exemplary embodiment of the invention.
Figure 7A:
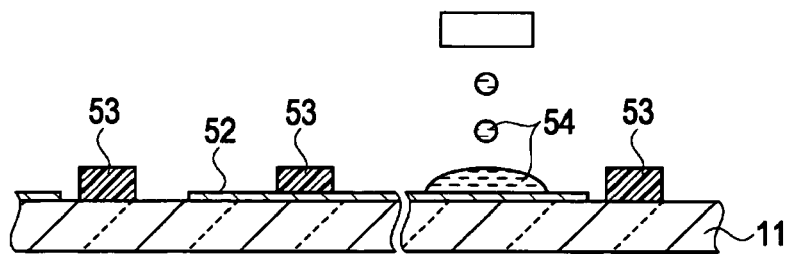
FIGS. 7A, 7B, 7C, and 7D is a set of sectional views that schematically illustrates an example of a liquid crystal panel in the manufacturing processes thereof according to an exemplary embodiment of the invention.
Figure 7B:
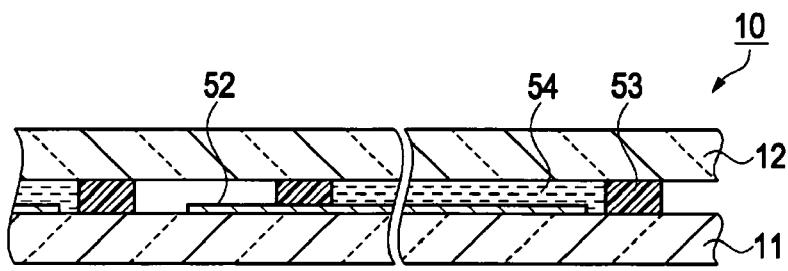

Next, with reference to FIGS. 5-9, a method for producing the liquid crystal panel 50, which is an example of an electro-optical device, by means of the small-piece removing apparatus 1 described above is explained below. FIG. 5 is a flowchart that illustrates an example of the method for manufacturing the liquid crystal panel 50 according to the present embodiment of the invention. FIG. 6 is a sub-flowchart that explains the detailed sub-processes contained in the small-piece removing process (step S4) illustrated in FIG. 5. FIGS. 7A, 7B, 7C, and 7D as well as FIGS. 8A, 8B, 8C, and 8D is a set of sectional views that schematically illustrates an example of the liquid crystal panel 50 in the manufacturing processes thereof according to an exemplary embodiment of the invention. FIGS. 9A and 9B is a set of sectional views that schematically illustrates an example of the small-piece removing apparatus 1 and the ring-fitted wafer 20 used in manufacturing processes according to an exemplary embodiment of the invention. In the following description, a method for producing the liquid crystal panel 50 according to the present embodiment of the invention is explained while referring to the flowchart illustrated in FIG. 5.

In a first step S1, the first mother substrate 11 and the second mother substrate 12 are joined with each other so as to form the wafer 10. Specifically, after the formation of the terminals 52 and circuit elements on the first mother substrate 11, the sealant 53 is applied onto the first mother substrate 11 in a frame-like sealing region thereof. Then, a proper dose of the liquid crystal material 54 is dropped on a region enclosed by the frame-like sealant 53 over the first mother substrate 11 as illustrated in FIG. 7A. Next, the second mother substrate 12 is adhered to the first mother substrate 11 by means of the sealant 53 as illustrated in FIG. 7B. The sealant 53 is dried thereafter. In this way, the wafer 10 that is made up of the first mother substrate 11 and the second mother substrate 12 with the liquid crystal 54 being sandwiched therebetween is manufactured. It should be noted that the method for producing the liquid crystal panel 50 according to the present embodiment of the invention is not limited to the above exemplary wafer formation method. As a non-limiting example of modifications thereof, the sealant 53 may be applied not to the first mother substrate 11 but to the second mother substrate 12. As another non-limiting example thereof, the liquid crystal material 54 may be dropped not on the first mother substrate 11 but on the second mother substrate 12 before adhesion thereof.

Figure 7C:
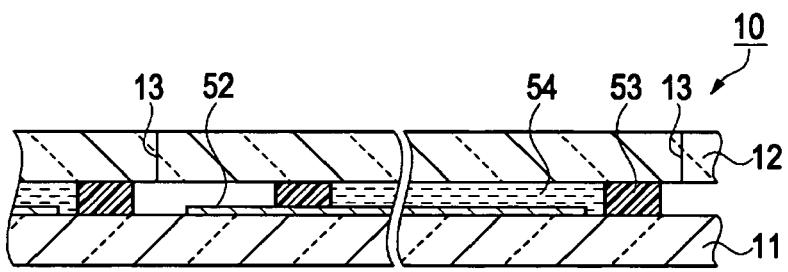
Figure 8A:
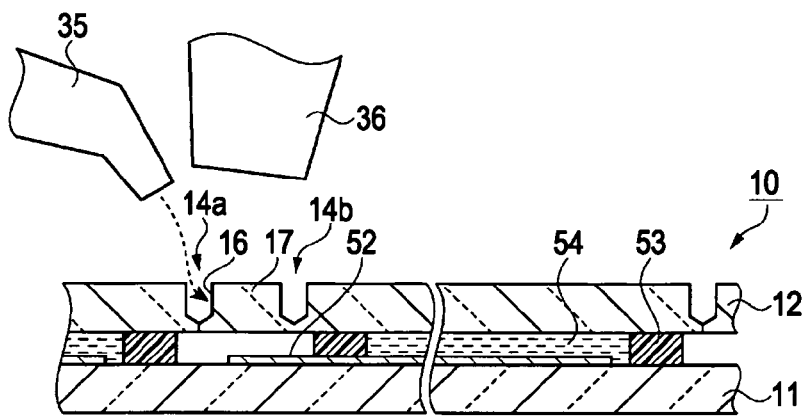
FIGS. 8A, 8B, 8C, and 8D is a set of sectional views that schematically illustrates an example of a liquid crystal panel in the manufacturing processes thereof according to an exemplary embodiment of the invention.
Figure 8B:
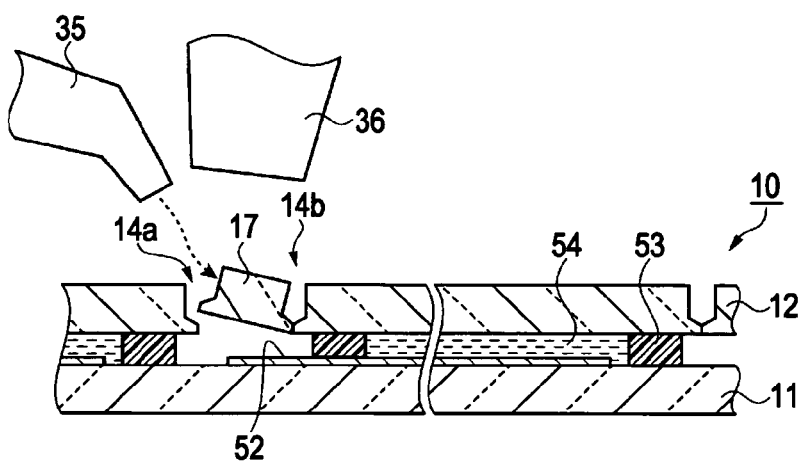
Figure 8C:
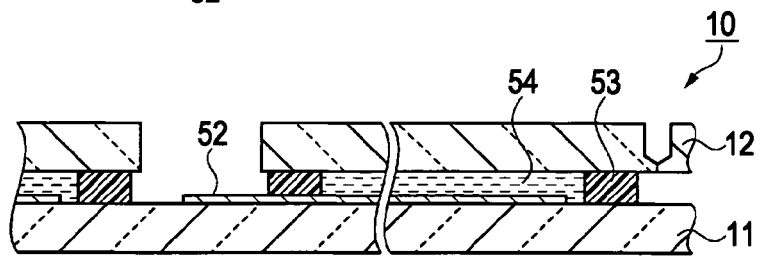

Next, in a second step S2, as illustrated in FIG. 7C, the second mother substrate 12 is subjected to (a first) scribe-and-break processing along the scribe lines 13. Specifically, the surface of the second mother substrate 12 is scribed with a diamond cutter, though not limited thereto. Thereafter, a mechanical stress is applied to the scribed second mother substrate 12 from the first-mother-substrate (11) side. By this means, the second mother substrate 12 is "broken". In the S2 scribe-and-break process described above, the broken second mother substrate 12 does not come off from the wafer 10 because it is still adhered to the first mother substrate 11 by means of the sealant 53. As understood from FIG. 2A and FIG. 7C, the scribe line 13 is not formed along both of two line segments that define the edges of the small piece 17 (i.e., that demarcate the small piece 17 therebetween), which is the target of removal, but along only one thereof. Specifically, the scribe line 13 is formed along one line segment that does not overlap the terminals 52 when viewed from the positive Z direction, that is, in a plan view. Therefore, in no case, the terminals 52 get damaged in the scribe-and-break process.

Figure 7D:
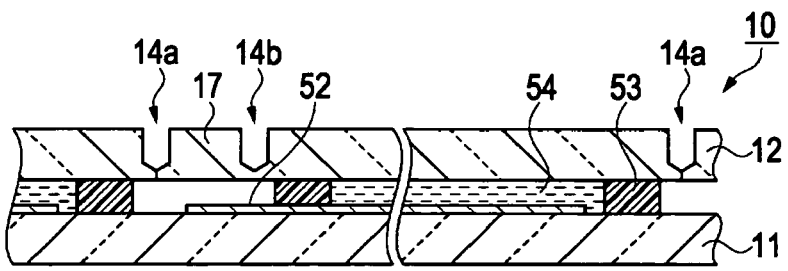

In a third step S3, as illustrated in FIG. 7D, the second mother substrate 12 is subjected to dicing along the dicing lines 14a and 14b. Specifically, the dicing is performed as follows. As a first step, the wafer 10 is adhered to the dicing tape 22, which constitutes a part of the ring-fitted wafer 20. Then, an incision is formed in the second mother substrate 12 along each of the dicing lines 14a and 14b. It should be noted that these incisions are bored in such a manner that each of them has a depth smaller than the thickness of the second mother substrate 12. Since each of the incisions has a depth smaller than the thickness of the second mother substrate 12, it is possible to avoid either a dicing blade or any broken fragment piece or particle of the second mother substrate 12 from damaging either the terminals 52 formed on the first mother substrate 11 or the first mother substrate 11 itself. As illustrated in FIG. 2A and FIG. 7D, the dicing lines 14a and 14b are formed along respective two line segments that define the edges of the small piece 17, or in other words, respective two line segments that demarcate the small piece 17 therebetween, which is the target of removal. That is, the target region to be removed, which is the small piece 17, is demarcated in this dicing step S3. It should be noted that the dicing line 14a constitutes the same line as the scribe line 13. The step S3 described above corresponds to "(e.g., a step of) forming a groove" according to the invention.

In the present embodiment of the invention, the Y-directional length of the diced region is approximately 0.3 mm.

The Y-directional length of the small piece 17, or, in other words, the interval between the dicing lines 14a and 14b, is approximately 1.5 mm. The thickness of the second mother substrate 12 is approximately 1.1 mm.

Next, in a fourth step S4, the small-piece portion (17) of the second mother substrate 12 is removed from the wafer 10. This fourth step S4 includes sub-steps S41-S46 illustrated in FIG. 6. In the following description, these sub-steps of the method for producing the liquid crystal panel 50 according to the present embodiment of the invention is explained in detail while referring to the flowchart illustrated in FIG. 6.

First of all, in a sub-step S41, the ring-fitted wafer 20 having the wafer 10 that has been subjected to dicing is loaded out of the wafer cassette 31 as illustrated in FIG. 9A. The loading of the ring-fitted wafer 20 out of the wafer cassette 31 is carried out as follows. As a first step, the chuck 42 is moved along the stage support pillar 44 in the Z direction while moving the stage support pillar 44 along the slider 45 in the Y direction. In this way, the chuck 42 is moved to the position of the ring-fitted wafer 20 housed in the wafer cassette 31. Then, the stage support pillar 44 is moved along the slider 45 in the positive Y direction with the chuck 42 holding the dicing ring frame 21 of the ring-fitted wafer 20 so as to draw the ring-fitted wafer 20 out of the wafer cassette 31 and then carry it along the guiding rails 33 (refer to FIG. 1). The guiding rails 33 are not shown in FIG. 9A.

Next, as illustrated in FIG. 9B, the wafer 10 is placed on the stage 41 in a sub-step S42. The setting of the wafer 10 on the stage 41 is carried out as follows. As a first step of the S42, the chuck 42 releases the ring-fitted wafer 20. Then, the stage support pillar 44 is moved along the slider 45 in the Y direction while moving the stage 41 along the stage support pillar 44 in the Z direction. In this way, the stage 41 is moved to the position under the ring-fitted wafer 20. Next, the stage 41 is moved along the stage support pillar 44 in the Z direction so as to contact the stage 41 and the first mother substrate 11 of the wafer 10 with the dicing tape 22 being sandwiched therebetween. In order to contact the stage 41 and the first mother substrate 11 of the wafer 10, the wafer 10 is raised in the Z direction until it is positioned above the dicing ring frame 21. In addition, the stage 41 vacuum-chucks the wafer 10; that is, the stage 41 holds the wafer 10 by means of a suction force.

In a sub-step S43, the positional alignment of the wafer 10 is performed. The alignment of the wafer 10 is performed by fine-adjusting the position of the stage 41 on the X-Y plane while rotating the stage 41 together with the wafer 10, which is being vacuum-chucked thereby, around the Z axis, which is driven by the stage supporting unit 43.

Next, in a sub-step S44, as illustrated in FIG. 9B, the blowing nozzle 35 blows compressed air on (each row of) the small pieces 17 of the second mother substrate 12. In addition thereto, in the sub-step S44, the vacuum nozzle 36 vacuums up each of the small pieces 17 that have come off from the second mother substrate 12. Specifically, as illustrated in FIG. 8A, the blowing nozzle 35 blows compressed air on one of two edge faces formed on the small piece 17 in the dicing process of the third step S3. Herein, one of two edge faces is an end face 16 that has been subjected to the scribe-and-break processing in the second step S2 described above. That is, the blowing nozzle 35 blows compressed air on the small piece 17 not toward the dicing line 14b but toward the dicing line 14a so as to apply air pressure on the small piece 17. Concurrently with the blowing of compressed air thereon, the vacuum nozzle 36 vacuums up the small piece 17 from a side opposite the first mother substrate 11, that is, from a certain positive Z point.

Since one side of the small piece 17 that has been subjected to the scribe-and-break processing along the scribe line 13 (i.e., dicing line 14a) is completely disconnected from its adjoining regional portion, a breaking leverage pressure is applied onto the small piece 17 at the disconnected portion by the air pressure. As a result of breaking pressure, since the vacuum nozzle 36 exerts suction on the small piece 17, the small piece 17 receives a positive Z-directional force (i.e., upward in FIG. 8A). In other words, the small piece 17 that constitutes a portion of the second mother substrate 12 as illustrated in FIG. 8A receives a rotational force so that it turns around the bottom portion of the dicing-line groove 14b clockwise as illustrated in FIG. 8B. That is, as a result of the compressed air pressure that is applied by the blowing nozzle 35 and the suction force that is applied by the vacuum nozzle 36, the remaining bottom portion thereof that has not been diced along the dicing line 14b becomes broken. By this means, the small piece 17 comes off from the second mother substrate 12. Then, the vacuum nozzle 36 vacuums up the small piece 17 that has come off from the second mother substrate 12. In this way, it is possible to remove the small piece 17 as illustrated in FIG. 8C. It is preferable that the vacuum nozzle 36 should exert suction on the small piece 17 at the other edge face thereof that is opposite one edge face thereof where the blowing nozzle 35 supplies compressed air.

When the small piece 17 comes off from the second mother substrate 12, the vacuum nozzle 36 constantly applies a positive Z-directional suction force thereto. For this reason, it is unlikely that the broken small piece 17 gets drifted in the negative Z direction, which means that the small piece 17 is substantially free from a risk of contact with the first mother substrate 11. Therefore, in the sub-step S44 described above, in spite of the close proximity of the first mother substrate 11 and the second mother substrate 12 which have a gap interval of a few micrometers or so therebetween, the method for manufacturing the liquid crystal panel 50 according to the present embodiment of the invention makes it possible to remove the small piece 17 without involving a risk of damaging the terminals 52 of the first mother substrate 11 by the small piece 17. Since the vacuum nozzle 36 applies a suction force to the small piece 17 while the blowing nozzle 35 applies compressed air pressure thereto concurrently, it is possible to remove the small piece 17 in an easy manner. Even if the small piece 17 is in a state that is hard to be removed by the suction only, the method for manufacturing the liquid crystal panel 50 according to the present embodiment of the invention makes it possible to remove the small piece 17 without touching the small piece 17. For example, even in a case where the small piece 17 is adhered to the first mother substrate 11 by a "dummy seal" that is provided at the periphery of the wafer 10, it is still possible to remove the small piece 17 in an easy manner.

In the sub-step S44 described above, it is possible to remove a plurality of the small pieces 17 of the wafer 10 illustrated in FIG. 2 that are aligned in a plurality of rows extending along the X direction not individually on a chip-by-chip basis but in a single batch process performed on a line-by-line basis. Therefore, it is possible to improve the productivity of the liquid crystal panel 50 by removing each row of the small pieces 17 on a line-by-line basis. A judgment as to whether all of the small pieces 17 that constitute a row have been removed or not is made by means of the infrared radiation sensors 34. Specifically, the pair of the infrared radiation sensors 34 is set at the ends of the line segment of the current removal target small pieces 17 so as to detect an infrared ray therebetween. If all of the small pieces 17 have been removed successfully, the pair of the infrared radiation sensors 34 detects an infrared ray because there is no obstacle, that is, any small piece 17, which shuts it off therebetween. On the other hand, if there is any small piece(s) 17 that remains without being removed, since an infrared ray is blocked by it in such a case, the infrared radiation sensor 34 does not detect the infrared ray; or, the intensity of the detected infrared ray is relatively small. In this way, it is possible to judge whether all of small pieces 17 that constitute a removal target row have been removed or not.

Next, in a step S45, a judgment is made as to whether the removal of the small pieces 17 of all of rows each of which extends in the X direction from the wafer 10 illustrated in FIG. 2A has been completed or not. If there is any row of the small pieces 17 that has not been removed yet, the process returns to the step S43 described above so as to perform alignment, followed by air blow and suction for removal thereof. On the other hand, if the removal of all of rows thereof has already been completed, the process moves on to a step S46.

In the step S46, after completion of the removal of the small pieces 17, the ring-fitted wafer 20 with the wafer 10 is unloaded, that is, re-stored into the wafer cassette 31. Specifically, the unloading of the ring-fitted wafer 20 is performed as follows. As a first step of the process S46, the stage 41 releases the vacuum chuck of the wafer 10. Next, the stage support pillar 44 is moved along the slider 45 in the negative Y direction with the chuck 42 holding the dicing ring frame 21 of the ring-fitted wafer 20 so as to unload the ring-fitted wafer 20 into the wafer cassette 31, which is similar to the loading process performed in the step S41 described above.

This ends the small-piece removing process (step S4) that includes the sub-steps S41-S46.

Figure 8D:
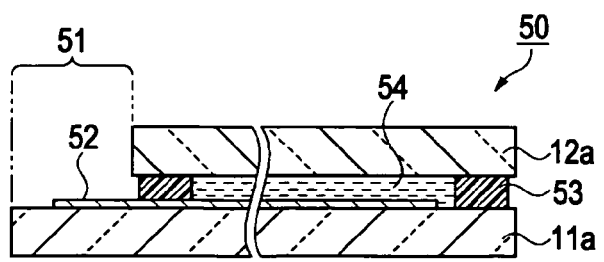
Figure 9A:
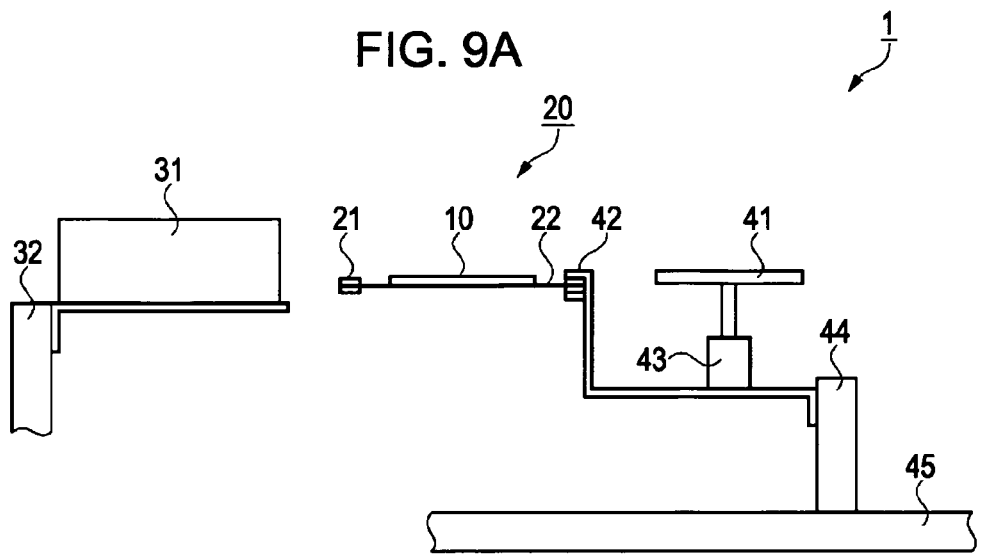
FIGS. 9A and 9B is a set of sectional views that schematically illustrates an example of a small-piece removing apparatus and a ring-fitted wafer used in manufacturing processes according to an exemplary embodiment of the invention.
Figure 9B:
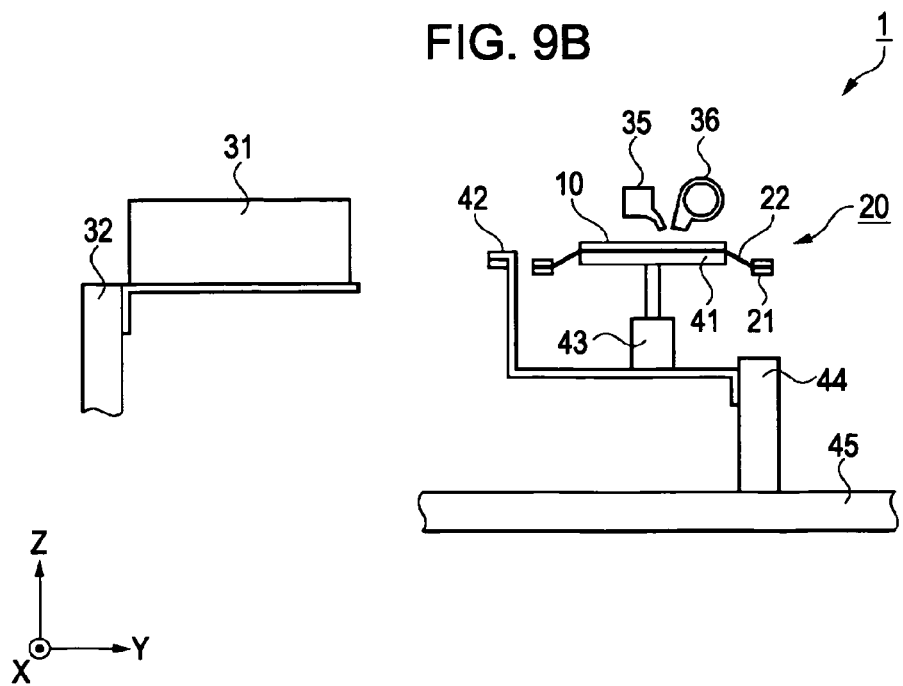

Referring back to FIG. 5, in a step S5, the wafer 10 is subjected to a second scribe-and-break processing so as to complete the production of the liquid crystal panel 50 as illustrated in FIG. 8D. Specifically, the S5 scribe-and-break processing is performed as follows. As a first step thereof, the wafer 10 is removed from the dicing tape 22. Then, the first mother substrate 11 and the second mother substrate 12 are subjected to the second (S5) scribe-and-break processing along the scribe lines 13 and 15 illustrated in FIG. 2A. As a result thereof, the liquid crystal panel 50 illustrated in FIGS. 3A and 3B as well as FIG. 8D is obtained. Since the small piece 17 has been removed in the foregoing step S4, the terminals 52 of the manufactured liquid crystal panel 50 are exposed at the terminal region 51.

The liquid crystal panel 50, which is a non-limiting example of an electro-optical device according to the present embodiment of the invention, is manufactured through the series of processes and sub-processes described above. The above-described production method makes it possible to manufacture, with a high yield rate, the liquid crystal panel 50 that is capable of displaying a high-quality image that is substantially free from any display defects because the risk of damaging the terminals 52 in the process of removing the small piece 17 is very low.

Although various exemplary embodiments of the present invention are described above, needless to say, the invention is in no case restricted to these exemplary embodiments described herein; the invention may be configured in an adaptable manner in a variety of variations and/or modifications without departing from the spirit thereof. Some of conceivable variation examples are as follows.

Variation Example 1

In the foregoing exemplary embodiments of the invention, the unique features of the invention are applied to the liquid crystal device 50, which is an example of an electro-optical device according to the invention. Notwithstanding the foregoing, the invention may be applied to other various kinds of electro-optical devices including but not limited to an organic electroluminescence (EL) device.

What is claimed is:

1. A method for producing an electro-optical device that is manufactured by cutting panel formation regions of a pair of mother substrates that includes a first mother substrate and a second mother substrate that are joined to each other by a sealant with an electro-optical material being sandwiched therebetween, the method comprising:
   forming two grooves in the second mother substrate;
   blowing air on one edge face of a region between the grooves formed in the second mother substrate; and
   removing the region between the grooves formed in the second mother substrate by a vacuum applied to another face of the region;
   wherein, prior to the formation of each of the two grooves, the second mother substrate is subjected to a scribe-and-break process along a pre-work cut line that corresponds to one of the two grooves formed in the second mother substrate.

2. The method for producing an electro-optical device according to claim 1, wherein each of the grooves is formed by dicing to form an incision that has a depth smaller than the thickness of the second mother substrate.

3. The method for producing an electro-optical device according to claim 1, wherein the edge face on which the air is blown comprises an end face that has been subjected to the scribe-and-break processing.

4. The method for producing an electro-optical device according to claim 1, wherein the electro-optical device has, as a pair of substrates, an element substrate that has a pixel electrode and a circuit element which is electrically connected to the pixel electrode, and a counter substrate that has a counter electrode provided opposite the pixel electrode; one of the pair of mother substrates has a plurality of the counter substrates; and the other of the pair of mother substrates has a plurality of the element substrates.

5. The method for producing an electro-optical device according to claim 1, wherein the second mother substrate is not subjected to a scribe-and-break process along a pre-work cut line that corresponds to the other of the two grooves.

\* \* \* \* \*